United States Patent
Perry et al.

(10) Patent No.: US 6,609,680 B2
(45) Date of Patent: Aug. 26, 2003

(54) HIGH ALTITUDE AIRSHIPS

(75) Inventors: William Dean Perry, San Antonio, TX (US); Thomas Howard Jaeckle, San Antonio, TX (US); Allan Bernard Black, San Antonio, TX (US); Lawrence Ernest Epley, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 09/862,507

(22) Filed: May 23, 2001

(65) Prior Publication Data

US 2002/0175243 A1 Nov. 28, 2002

Related U.S. Application Data

(60) Provisional application No. 60/207,789, filed on May 30, 2000.

(51) Int. Cl.$^7$ .............................. B64B 1/02; B64B 1/70
(52) U.S. Cl. ............................ 244/30; 244/97; 244/98; 244/127
(58) Field of Search .............................. 244/30, 31, 32, 244/93, 97, 98, 127

(56) References Cited

U.S. PATENT DOCUMENTS

| | | | | |
|---|---|---|---|---|
| 1,340,053 A | * | 5/1920 | Janda | 244/30 |
| 1,370,043 A | * | 3/1921 | Preston | 244/30 |
| 1,430,393 A | * | 9/1922 | Lynde | 244/127 X |
| 3,141,636 A | | 7/1964 | Merrill et al. | 244/31 |
| 3,312,427 A | | 4/1967 | Yost et al. | 244/31 |
| 3,706,433 A | | 12/1972 | Sonstegaard | 244/128 |
| 3,807,384 A | * | 4/1974 | Schach et al. | 244/31 X |
| 4,114,837 A | | 9/1978 | Pavlecka et al. | 244/26 |
| 4,272,042 A | * | 6/1981 | Slater | 244/30 X |
| 4,995,572 A | | 2/1991 | Piasecki | 244/2 |
| 6,386,480 B1 | * | 5/2002 | Perry et al. | 244/31 X |
| 6,427,943 B2 | * | 8/2002 | Yokomaku et al. | 244/30 |

FOREIGN PATENT DOCUMENTS

JP         404071995 A  *  3/1992 .................. 244/97

* cited by examiner

*Primary Examiner*—Robert P. Swiatek
(74) *Attorney, Agent, or Firm*—Oliff & Berridge, PLC

(57) ABSTRACT

A high-altitude airship has a non-rigid hull. On launch, the airship is partially inflated with a lifting gas. The partially inflated hull is less susceptible to buffeting and turbulence from lower atmosphere air currents during ascent. A ballast rotates the airship into a flight attitude (e.g., near horizontal) upon reaching a desired altitude. A low-powered propulsion system may be included to propel the airship at the desired altitude. Upon completion of its mission, the airship may be deflated and returned using aerodynamic deceleration such as a parachute, a parafoil and a ballute.

19 Claims, 9 Drawing Sheets

HIGH ALTITUDE AIRSHIPS

This application claims the benefit under Title 35 United States Code §119(e) of U.S. Provisional Application No. 60/207,789, filed May 30, 2000. This provisional application is hereby incorporated by reference in its entirety into this application.

GOVERNMENT LICENSE RIGHTS

The U.S. Government has a paid-up license in this invention and the right in certain circumstances to require the patent owner to license others on reasonable terms as provided for by the terms of Contract No. F41621-93-05006 D.O. 0026 for the Joint Command and Control Warfare Center.

BACKGROUND OF THE INVENTION

1. Field of Invention

The present invention relates to the field of lighter-than-air vehicles.

2. Description of Related Art

Lighter-than-air vehicles, particularly the non-rigid type, have been used for a variety of applications including rescue, cargo transportation, and meteorological research. In a typical case, an airship is launched with the hull fully and stiffly inflated, ascends to a target altitude, performs its mission, and returns to the ground with the hull still fully inflated. One or more ballonets are used to keep the hull under pressure in order to maintain the rigid shape of the hull during the ascent and descent through the atmosphere. The ballonets are typically fully inflated at take-off and gradually depressurized or vented to ascend the airship, then inflated again to descend the airship. However, ballonets and their associated pump equipment increase the size, weight, and cost of the airship. Accordingly, new technology is needed.

SUMMARY OF THE INVENTION

The invention provides high-altitude atmospheric airships (and methods for operating same) that are capable of traversing the lower atmosphere without a heavy weight hull, ballonets, or a high-powered propulsion system. The airships may include a non-rigid hull and an airship rotating device.

The hull of an airship may be partially inflated with a lifting gas at ground level to float the airship. When a predetermined altitude is reached, the airship may be rotated into a flight attitude (e.g. level) by the airship rotating device.

The airship rotating device may be a self-righting ballast, for example. The self-righting ballast may include a rear fluid reservoir connected to a forward fluid reservoir by a fluid conduit mounted on the airship hull. The fluid may be moved between the rear and the forward reservoirs to rotate the airship into the flight attitude. For example, the fluid may be moved to align a center of gravity of the airship with a center of buoyancy of the airship. Other types of self-righting ballasts may also be used, such as moving a weight between two points anchored on the hull.

To return to ground level, the airship may include a lifting gas release device such as a selectively ignitable pyrotechnic fuse attached to the hull. When ignited, the pyrotechnic fuse releases the lifting gas from the airship hull, thus permitting the airship to descend. An aerodynamic decelerator such as a parachute may be used for aerodynamically decelerating the airship to ground level.

Other sensors and detectors may be included in the airship such as altitude, yaw, roll and pitch sensors. The altitude sensor may be used to detect when a desired altitude has been reached, and the yaw, roll and pitch detectors may be used to determine airship attitude and orientation. A low-powered propulsion system may also be provided for propulsion, if needed.

DETAILED DESCRIPTION OF PREFERRED EMBODIMENTS

A conventional upper atmospheric airship is fully inflated at all altitudes relying on ballonets to adjust airship buoyancy for desired altitudes. For example, at sea level, the ballonets may be inflated with air to occupy up to 94% of the hull volume, and, at high altitudes, they may be almost completely deflated (for increased volume of lifting gas). Because the hull is fully inflated at all altitudes, the airship is subjected to buffeting and turbulence from air currents in the atmosphere during both ascent and descent of the airship through the atmosphere. These air currents can be particularly strong in the lower atmosphere (roughly 60,000 feet or less) due to higher air density at these altitudes. Therefore, a relatively high-powered propulsion system is required in most cases during the ascent and descent of the conventional airship through the lower atmosphere.

In addition, a relatively thick and sturdy hull is required to withstand forces of the air currents in the lower atmosphere, and to maneuver the airship on a desired trajectory. Maneuverability is especially important if a controlled landing to a specific location is required. The airship often must hold its position over a landing site while a ground crew secures handling lines, or the airship must maneuver onto its mooring mast or into a hangar.

Once the airship reaches the upper atmosphere (roughly 65,000 feet or more), the ballonets are no longer required because lifting gas between the hull and the ballonets may inflate the hull. The thick hull and the high-powered propulsion system are also not required because the air is less dense at these altitudes. However, the airship must be equipped with these items and their associated components for travel through the lower atmosphere even though they are heavy, complicated, and costly. Therefore, this invention provides a high-altitude airship without requiring these components.

Figure 1:
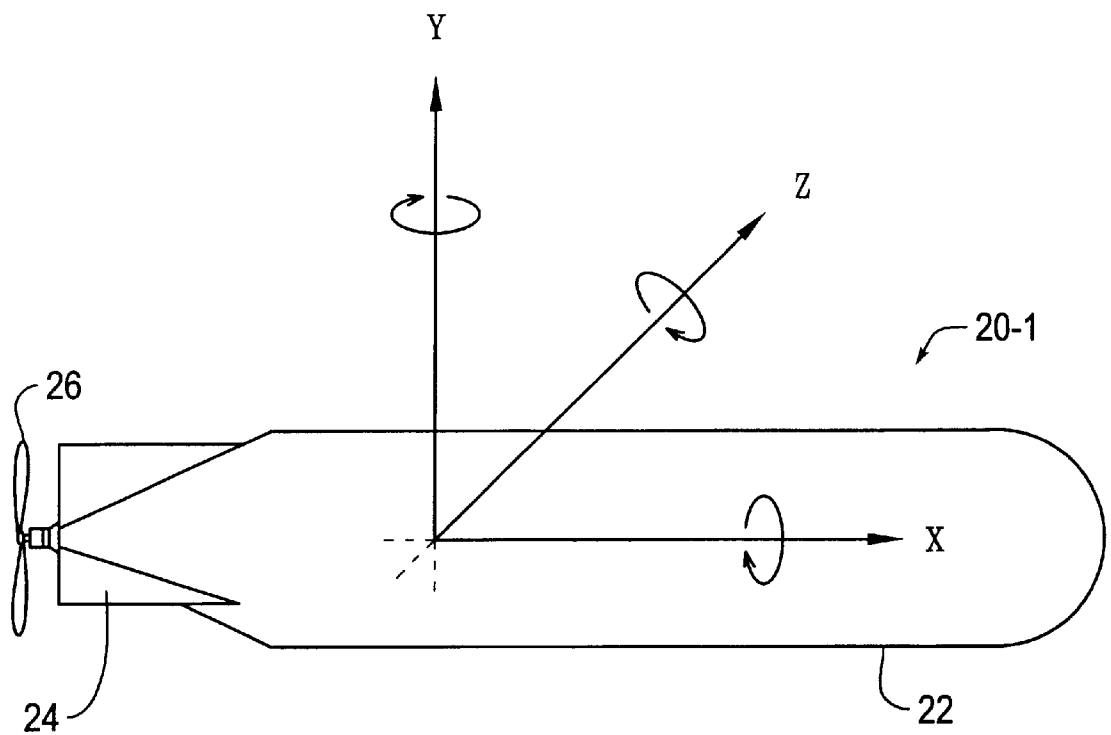
FIG. 1 illustrates an exemplary airship with primary axes of rotation.

FIG. 1 shows an exemplary high-altitude (e.g., upper atmosphere) airship 20-1. Movements of the airship will be described with respect to the X axis (roll), the Y axis (yaw), and the Z axis (pitch). The airship 20-1 has a light weight hull 22 (as opposed to the thick hull), a low-powered propulsion system 26, and fins 24. While FIG. 1 shows airship 20-1 to include the propulsion system 26 and fins 24, these components may not be required if only simple ascent and descent is needed without any maneuverability. In the following discussion various components are progressively added to the airship 20-1 to illustrate various possible features that may be obtained. However, the components need not be cumulatively added, but may be included in any mixture to obtain the corresponding feature.

Figure 2:
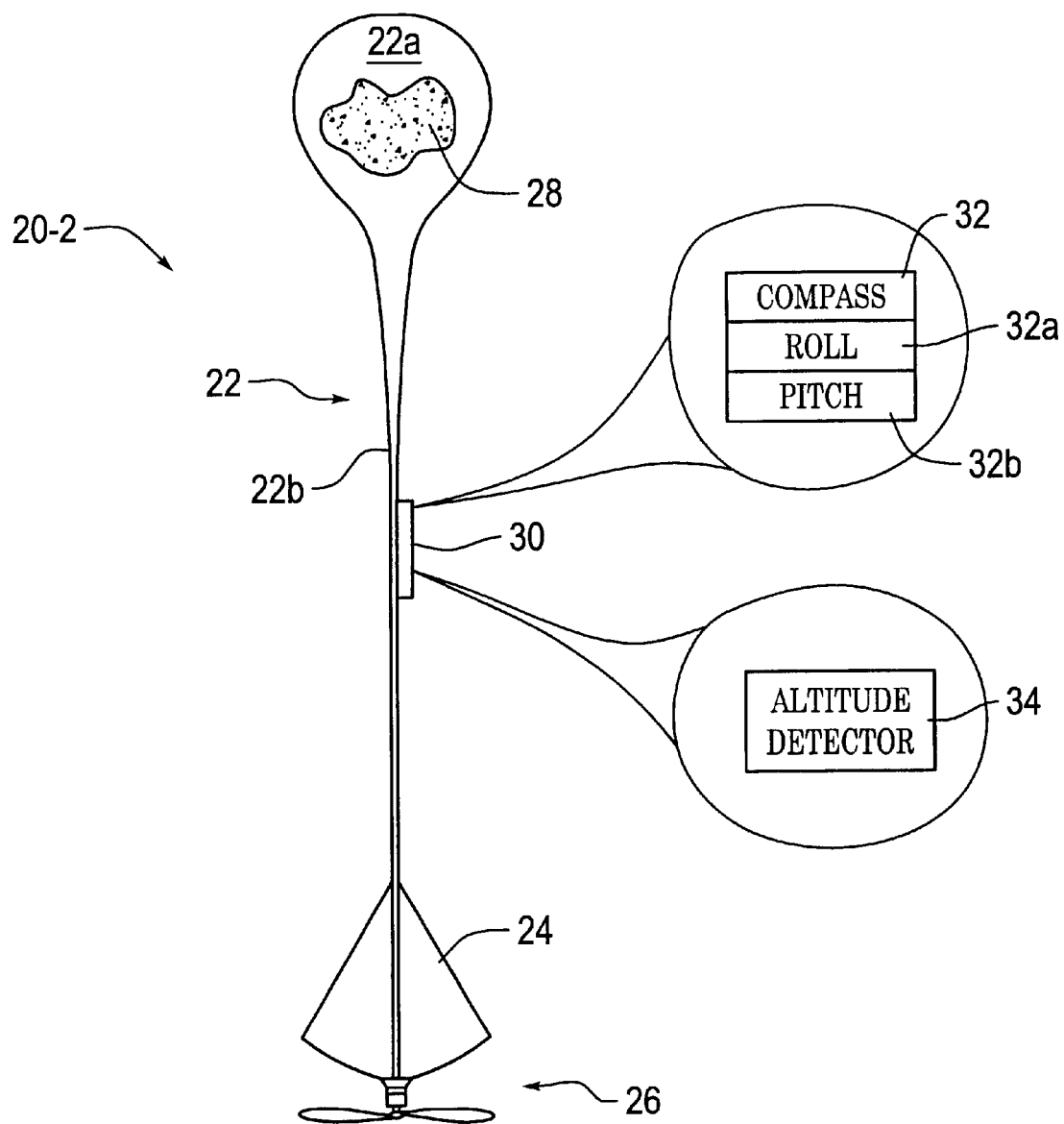
FIG. 2 illustrates a launch phase of an airship.

FIG. 2 shows an airship 20-2 during the launch phase. The airship 20-2 is the airship 20-1 further enhanced with a cargo block 30 which may include various flight and navigation instrumentation and research equipment such as yaw (compass), roll and pitch sensors 32, 32a, and 32b, respectively, and an altitude sensor 34, for example. Instead of full inflation, the hull 22 may be partially inflated so that only a nose portion 22a contains lifting gas 28, and an uninflated portion 22b hangs loosely from the nose portion 22a. In this configuration, the overall surface area exposure of the airship 20-2 to the air currents is reduced when compared to a fully inflated hull. The reduced surface area exposure reduces the airship's susceptibility to drag, turbulence, and other effects of the air currents during flight through the dense lower atmosphere.

This reduced susceptibility to forces of the air currents permits the hull 22 of the airship 20-2 to be constructed of a thin and light weight material. For example, the hull 22 may have a thickness of about 0.025 mm (e.g., a clear or transparent polymer film). In addition, if the airship is allowed to drift with the wind during ascent through the lower atmosphere, then no propulsion system activity is required during this phase.

Figure 3:
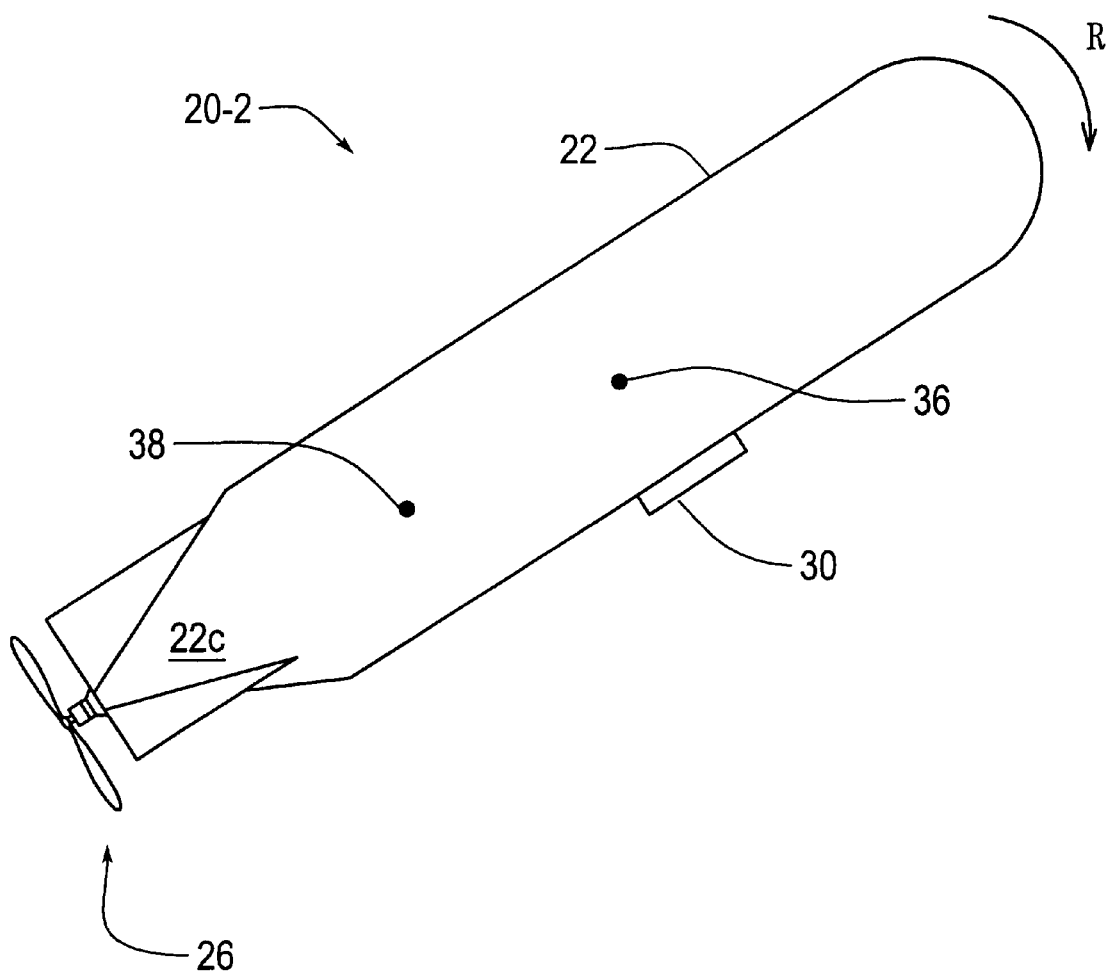
FIG. 3 illustrates a float phase of an airship.

An amount of lifting gas 28 that is required may be determined based on a desired altitude. The amount of lifting gas 28 in the hull 22 should be sufficient to make equal a weight of air displaced by a fully inflated hull 22 and a weight of the airship 20-2 at the desired altitude. As the airship 20-2 ascends through the atmosphere, the atmospheric pressure decreases allowing the lifting gas 28 to expand and consequently inflate the hull 22, as shown in FIG. 3. Thus, at the desired altitude where substantial equilibrium is established, the hull 22 becomes fully inflated, and may assume a rigid aerodynamic shape, if desired. For example, the amount of lifting gas 28 may be sufficient to carry the airship 20-2 to an altitude of about 100,000 feet.

If a stiff and rigid hull 22 is desired at the equilibrium altitude (e.g., flight altitude), a total volume of the hull 22 may be fixed to limit a degree of expansion for the lifting gas 28. The fixed volume of the hull 22 together with very low atmospheric pressure at the flight altitude cause the lifting gas 28 to become slightly super-pressurized within the hull 22. Thus, the hull 22 is ensured to be stiffly and rigidly inflated.

As the airship 20-2 ascends through the atmosphere, the hull 22 becomes more inflated and a center of buoyancy 36 moves toward a rear 22c of the hull 22. Thus, the airship 20-2 rotates in the pitch direction as indicated by the curved arrow R shown in FIG. 3. The airship 20-2 continues to rotate as it ascends through the atmosphere until the equilibrium altitude is reached and the airship 20-2 settles into a near horizontal (i.e., level) position (attitude).

Figure 4:
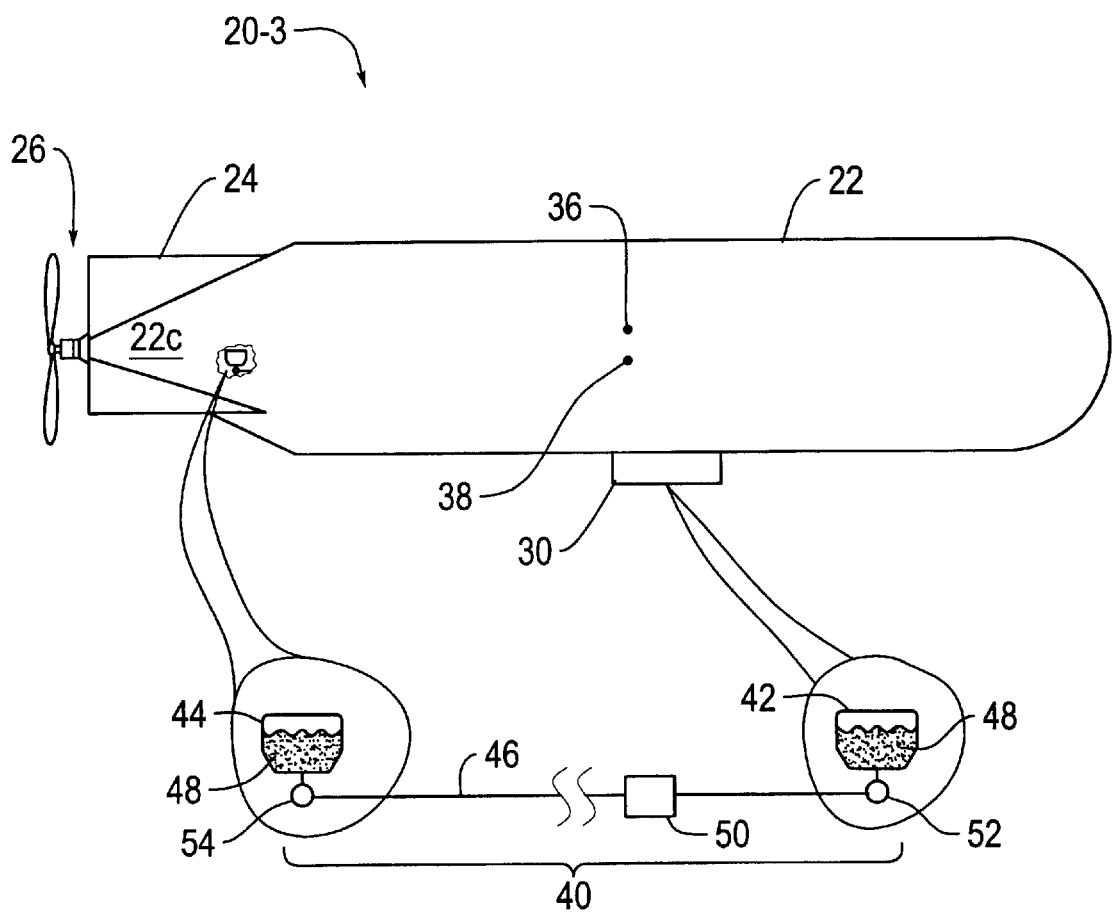
FIG. 4 illustrates an exemplary ballast assembly of an airship.

FIG. 4 shows an airship 20-3 which is the airship 20-2 enhanced by adding a ballast assembly 40 that may be used to bring the airship 20-3 into a substantially (near horizontal) level flight attitude. The ballast assembly 40 includes a forward reservoir 42, an aft reservoir 44 and ballast fluid 48. The forward and aft reservoirs 42 and 44 contain the ballast fluid 48, and are connected by a fluid line 46 through valves 52 and 54 and a fluid pump 50. The forward and aft valves 52 and 54 are connected near the forward and aft reservoirs 42 and 44, respectively.

Figure 5:
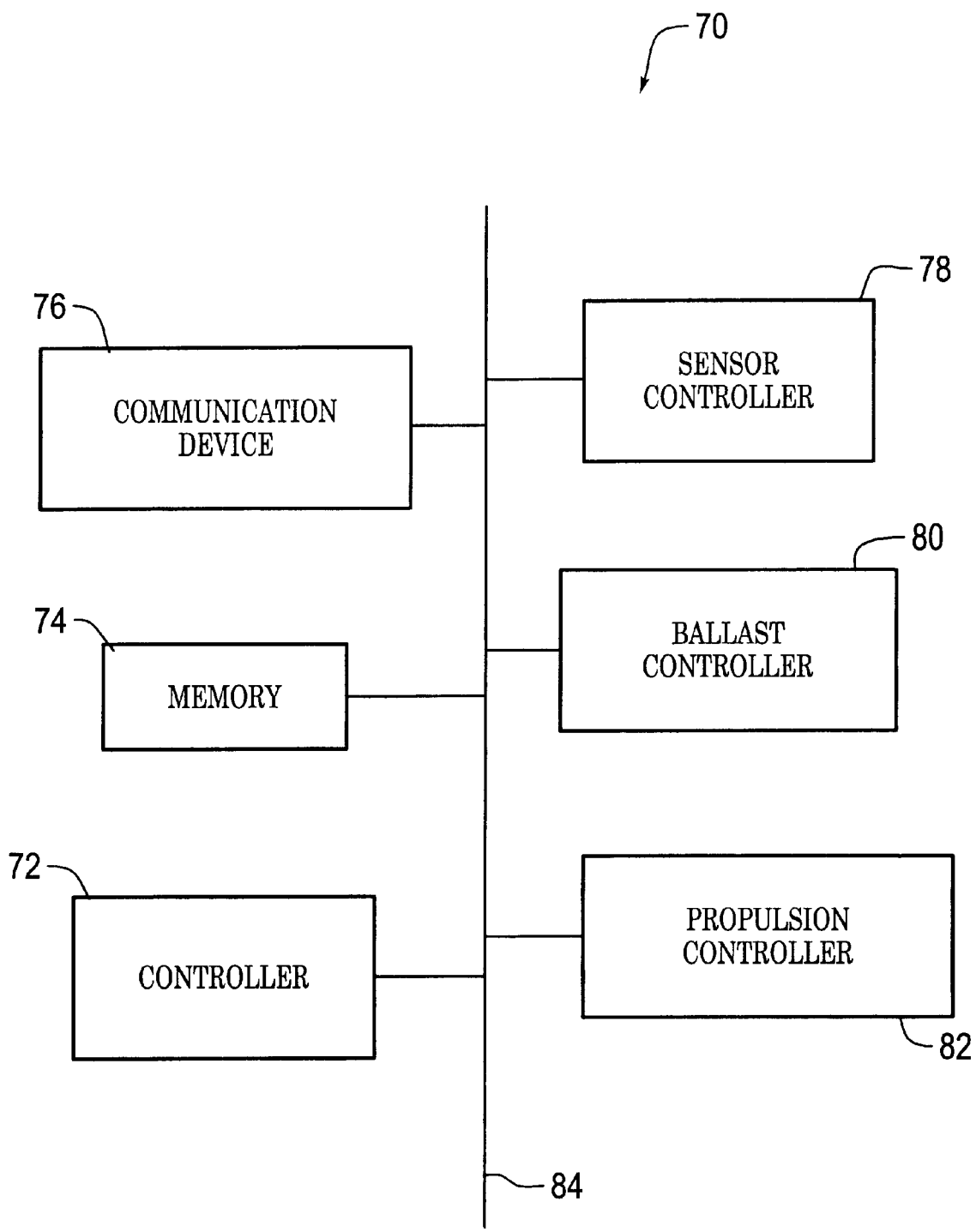
FIG. 5 illustrate an exemplary optional controller of an airship.

The ballast assembly 40 and the sensors 30-32b may be controlled by an exemplary airship control device 70 as shown in FIG. 5. The airship control device 70 may include a controller 72, a memory 74, a communication device 76, a sensor controller 78, a ballast controller 80 and a propulsion controller 82. The above components may be coupled together via a signal bus 84. While FIG. 5 illustrates the airship control device in terms of an electronic device, other types of devices may also be used to control the airship 20-3 including mechanical devices that operate each of the required functions independently. The level of sophistication is dependent on specific applications as is well known. For ease of discussion, the airship control device 70 shown in FIG. 5 is assumed.

The sensor controller 78 receives altitude readings from the altitude sensor 34 and detects when a change in altitude has decreased to within a predetermined value. For example, a current value of the altitude sensor 34 may be compared with a previous value to generate an altitude change value. The desired altitude may be detected when the altitude change value falls below a threshold. Other techniques may also be used such as generating the altitude change value by comparing the current value of the altitude sensor 34 with a fixed value representing the desired altitude, for example.

This detection may be performed in the altitude sensor 34. When this condition is met, a signal is sent to the ballast controller 80 to open the valves 52, 54 and activate the fluid pump 50. Ballast fluid 48 is pumped between the aft reservoir 44 and the forward reservoir 42 to align a center of gravity 38 of the airship 20-3 with the center of buoyancy 36 until the pitch reading from the pitch sensor 32 indicates that the airship 20-3 is in a desired flight position (usually horizontal) to carry out a mission.

The mission may be defined by a sequence of actions recorded in a program stored in the memory 74 and executed by the controller 72. Commands may be received through the communication device 76 to carry out the mission, or the mission may not require any commands but may be carried out automatically by simply transmitting or recording values generated by various sensors such as a temperature sensor for weather prediction purposes, for example. Depending on the complexity of the mission, the complexity of the airship control device 70 may be adjusted from full function to complete elimination.

If required, the propulsion system 26 may be included to execute the mission. The propulsion system 26 may be optimized for operation at high altitudes. Because the airship 20-3 is flying in the upper atmosphere where the air is less dense, a heavy high-powered propulsion system is not needed and a smaller, light weight propulsion system 26 may be used instead. For example, the motor assembly 58 may be smaller and lighter because less thrust is required to propel the airship 20-4, thus reducing the overall weight of the airship 20-3. The power required to propel the airship at a set airspeed is proportional to the density of the atmosphere. For example, the power required at 40 mbars is 4% of what would be necessary at sea level.

Figure 6:
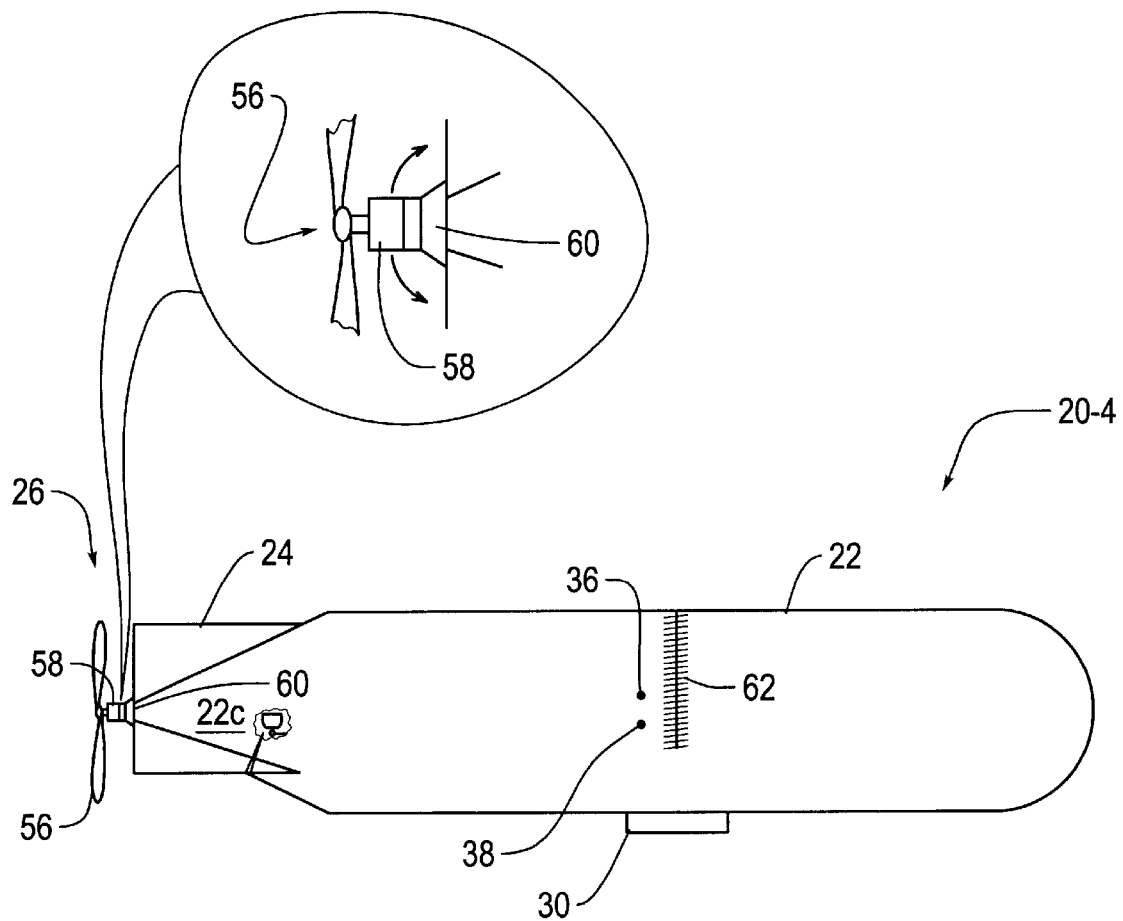
FIG. 6 illustrates an exemplary propulsion system of an airship.

The propulsion system 26 includes a propeller 56 and a motor assembly 58 that drives the propeller 56. A motor pivot 60 may also be included to provide left and right directional control of the airship 20 by moving the motor assembly 58 about the motor pivot 60, as shown in FIG. 6 for an airship 20-4. The propeller 56 may be multi-bladed fixed-pitched or a variable-pitched.

The airship 20-4 may also include tail fins 24 mounted on the tail portion 22c of the hull 22. The tail fins 24 stabilize and enhance the flight of the airship 20-4. Although only two tail fins 24 are visible here, preferably at least three tail fins are used.

Figure 7:
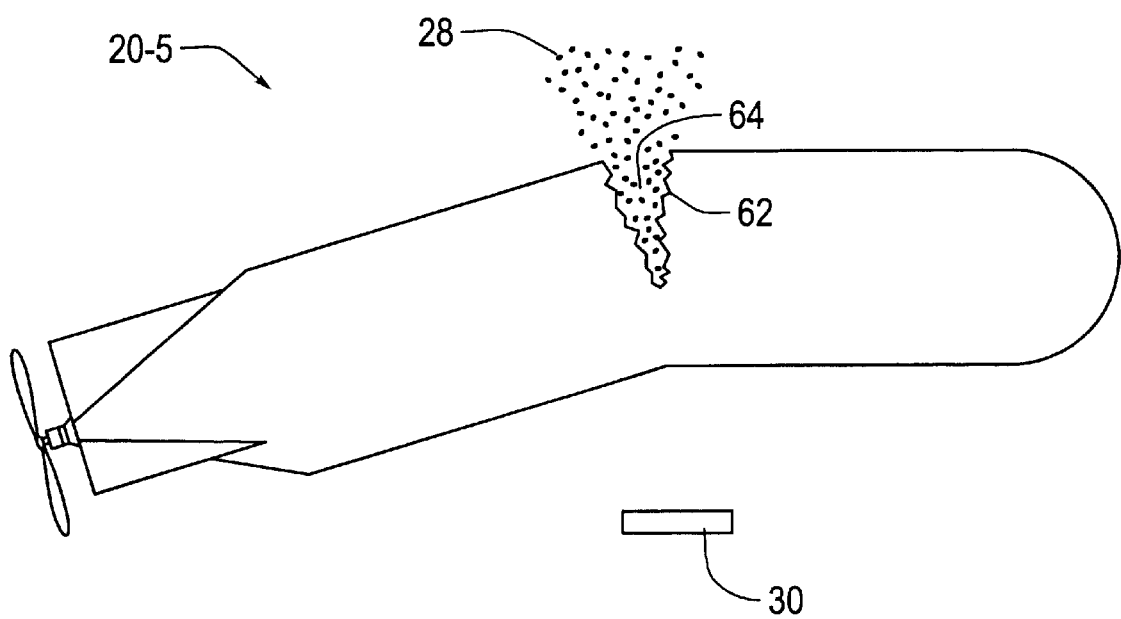
FIG. 7 illustrates a pyrotechnic fuse deployment in an exemplary termination phase of an airship.

The airship 20-4, shown in FIG. 7 as airship 20-5, may include a pyrotechnic fuse 62 attached circumferentially to the hull 22 at about the center-top of the hull 22. Upon completion of a mission, the fuse 62 may be ignited to create a large opening 64 in the hull 22. The opening 64 allows the lifting gas 28 (currently under pressure) to quickly escape, thus deflating the hull 22. The pyrotechnic fuse 62 may be ignited upon the occurrence of a particular event such as the completion of a certain task, or on expiration of a timer which coincides with the completion of the mission. Other techniques may also be used to release the lifting gas 28 such as providing a controllable vent.

Figure 8:
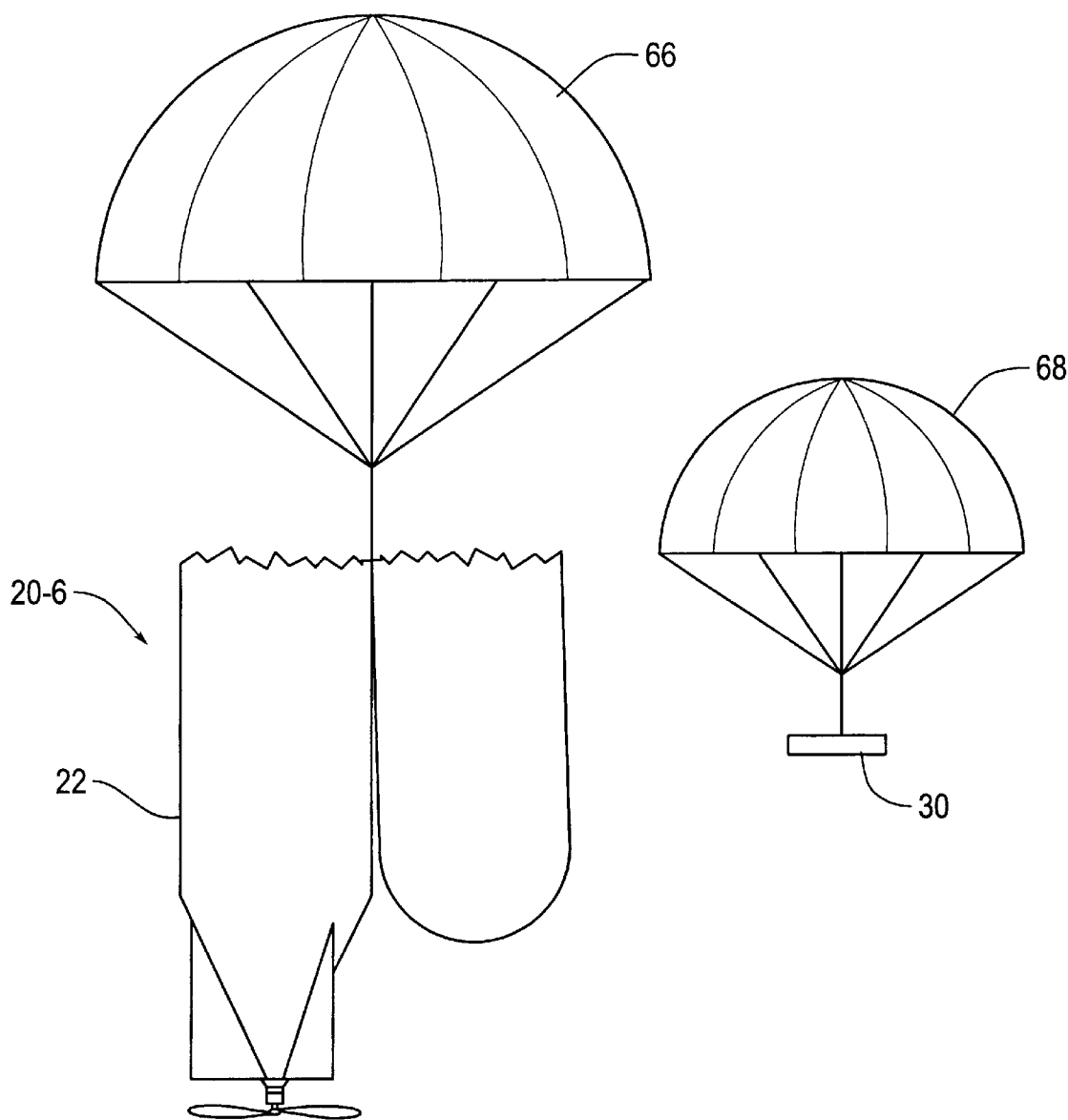
FIG. 8 illustrates an exemplary recovery phase of an airship.

Once the hull 22 has been deflated, one or more aerodynamic decelerators 66 such as a parachute, parafoil, or ballute may be provided for deployment to return the airship 20-6 to the ground, as shown in FIG. 8. While shown in FIG. 8 as being returned to the ground by a second aerodynamic decelerator 68 separately from airship 20-6, the cargo block 30 may remain attached to the hull 22 and be returned to the ground with the airship 20-6. The aerodynamic decelerator 66 may be of the guided or steered type, or it may be of the unguided type, both of which are well known to those of ordinary skill in the art.

The aerodynamic decelerators 66 eliminates the need for ballonets or a propulsion system that would otherwise be required if the airship 20-6 was flown back to the ground. In addition, the infrastructure requirement for landing an airship 20-6 is much less because a large landing site, a hangar, and a ground crew are not necessary.

Figure 9:
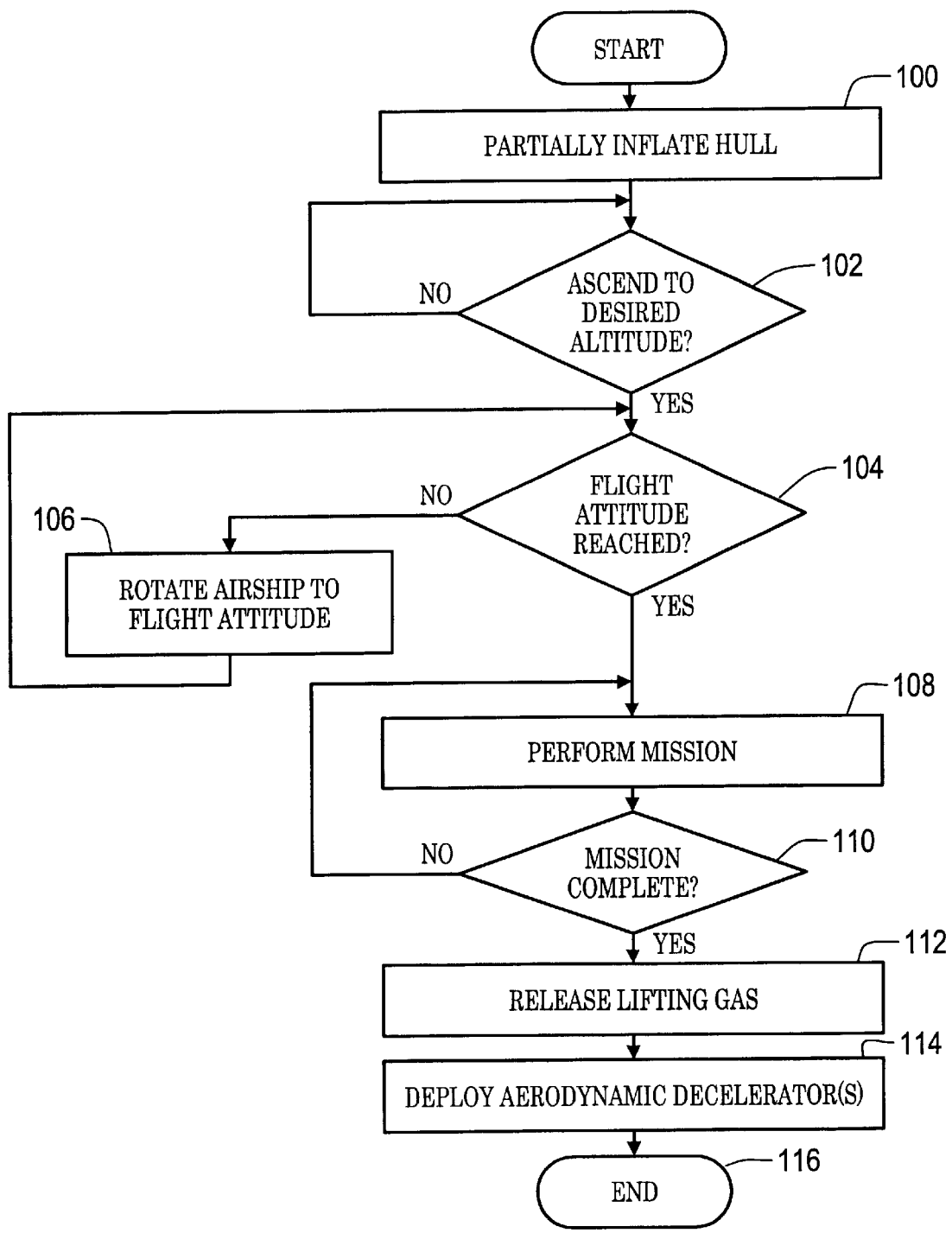
FIG. 9 is a flow chart of an exemplary process for operation of an airship.

FIG. 9 shows a process for operation an airship. In step 100, the airship hull 22 is partially inflated with an amount of lifting gas 28 sufficient to lift the airship to the desired altitude and the process goes to step 102. In step 102, the altitude sensor 34 is read to determine whether the desired altitude has been reached. If reached, then the process goes to step 104; otherwise, the process returns to step 102.

In step 104, the pitch sensor 32b is read to determine the attitude of the airship. If the attitude of the airship is the flight attitude, the process goes to step 108; otherwise the process goes to step 106. In step 106, the attitude of the airship is adjusted by using the ballast assembly 40, for example, and the process returns to step 104. As discussed, the ballast assembly pumps the ballast fluid 48 to align the center of buoyancy 36 with the center of gravity 38 to adjust the airship attitude. Other types of ballasts may be used such as moving a weight between two anchored points along a longitudinal axis of the hull 22.

In step 108, the airship performs the mission and the process goes to step 110. In step 110, the process determines whether the mission is completed. If completed, the process goes to step 112; otherwise, the process returns to step 108. In step 112, the process releases the lifting gas 28 from the hull 22. This may be performed by igniting the pyrotechnic fuse 62 or by opening a controlled vent, for example, and the process goes to step 114. In step 114, the aerodynamic decelerator(s) 66 and/or 68 are deployed and the process goes to step 116 and ends.

Although the invention has been described with reference to specific embodiments, various modifications and alternatives exist which were not described, but which are within the scope and spirit of the invention. Accordingly, the invention should be limited only by the following claims.

What is claimed is:

1. A method for operating an airship, comprising:
    partially inflating less than half of a hull with lifting gas to increase a buoyancy of the airship, the hull having both a relatively small inflated portion and a relatively large uninflated portion at a launch level;
    permitting the airship to reach a desired altitude;
    detecting that a desired altitude has been reached; and
    adjusting an attitude of the airship to a flight attitude.

2. The method of claim 1, further comprising
    limiting a volume of the hull; and
    permitting the lifting gas to be slightly super-pressurized.

3. The method of claim 1, further comprising adjusting an amount of the lifting gas sufficient to lift the airship to the desired altitude and to slightly super-pressurize the hull at the desired altitude.

4. The method of claim 1, the detecting comprising:
    reading a current value of a altitude sensor;
    generating an altitude change value by comparing a prior value of the altitude sensor and the current value; and
    detecting that the desired altitude has been reached when the altitude change value is below a threshold.

5. The method of claim 1, the adjusting an attitude comprising:
    detecting a pitch of the airship; and
    moving a center of gravity of the airship relative to a center of buoyancy of the airship.

6. The method of claim 5, further comprising aligning the center of gravity of the airship to the center of buoyancy of the airship to adjust the attitude of the airship to near horizontal.

7. The method of claim 5, the moving center of gravity comprising:
    setting valves of an aft reservoir and a forward reservoir; and
    pumping fluid between the aft and the forward reservoir.

8. The method of claim 1, further comprising:
    releasing the lifting gas from the hull; and
    aerodynamically decelerating the airship.

9. The method of claim 8, the releasing the lifting gas comprising at least one of:
    igniting a pyrotechnic fuse; or
    opening a controllable vent.

10. The method of claim 8, the aerodynamically decelerating comprising deploying at least one of:
    a parachute;
    a parafoil; or
    a ballute.

11. The method of claim 10, further comprising:
    separating the hull from a cargo block; and
    decelerating the hull and the cargo block separately using separating decelerating devices.

12. The method for operating an airship, comprising:
    partially inflating a hull with lifting gas to increase a buoyancy of the airship;
    detecting that a desired altitude has been reached;
    directing the lifting gas to a nose portion of the airship; and permitting an uninflated portion of the airship to hang loosely from the nose portion.

13. An airship, comprising:

a non-rigid hull; and a ballast assembly mounted on the hull;

wherein the ballast assembly comprises:
  ballast fluid;
  a forward reservoir;
  an aft reservoir; and
  a pump capable of pumping the ballast fluid between the forward and the aft reservoirs.

14. The airship of claim 13, further comprising a selectively ignitable pyrotechnic fuse attached to the hull, the pyrotechnic fuse releasing lifting gas from the hull when ignited.

15. An airship comprising:

a non-rigid bull having a variable shape;

a fluid ballast assembly mounted on the hull;

a low-powered propulsion system mounted on a tail portion of the hull; and a plurality of fins mounted on the tail portion of the hull.

16. An airship, comprising:

a non-rigid hull having a variable shape;

a fluid ballast assembly mounted on the hull; and wherein the hull has a thickness of about 0.025 mm.

17. A high-altitude airship, comprising:

a non-rigid hull having a thickness of about 0.025 mm and capable of being partially inflated;

means for rotating the airship;

means for propelling the airship;

mean for releasing lifting gas in the hull; and means for decelerating one or more components of the airship.

18. A high-altitude airship, comprising:

a non-rigid hull having a tail portion;

a self-righting ballast, including a forward fluid reservoir connected to a rear fluid reservoir by a fluid conduit, mounted on the hull and configured to rotate the airship into a near horizontal flight attitude at a desired altitude;

a selectively ignitable pyrotechnic fuse attached to the hull;

a parachute attached to the airship;

an altitude sensor, a yaw sensor and a pitch sensor; and a low-powered propulsion system and a plurality of tail fins mounted on the tail portion of the hull.

19. An airship comprising:

a hull; and a fluid ballast assembly mounted on the hull;

wherein the fluid ballast assembly uses fluid to adjust an attitude of the airship.

* * * * *